(12) United States Patent
Pang et al.

(10) Patent No.: US 11,546,430 B2
(45) Date of Patent: Jan. 3, 2023

(54) SECURE REMOTE WORKSPACE

(71) Applicant: Figure Eight Technologies, Inc., San Francisco, CA (US)

(72) Inventors: Wei Pang, Los Gatos, CA (US); Feng Zhu, Shanghai (CN); Brian William Hicks, Lake Stevens, WA (US); Michael Ronald Lapinskas, Novato, CA (US); Jiaohong Shi, Pleasanton, CA (US); Mengjie Jiang, Shanghai (CN); Yuheng Cai, Shenzhen (CN)

(73) Assignee: Figure Eight Technologies, Inc., San Francisco, CA (US)

( * ) Notice: Subject to any disclaimer, the term of this patent is extended or adjusted under 35 U.S.C. 154(b) by 96 days.

(21) Appl. No.: 16/846,893

(22) Filed: Apr. 13, 2020

(65) Prior Publication Data
US 2021/0176342 A1 Jun. 10, 2021

Related U.S. Application Data

(60) Provisional application No. 62/946,083, filed on Dec. 10, 2019.

(51) Int. Cl.
*H04L 29/00* (2006.01)
*H04L 67/131* (2022.01)
*H04L 9/40* (2022.01)

(52) U.S. Cl.
CPC ........ *H04L 67/131* (2022.05); *H04L 63/0236* (2013.01); *H04L 63/0272* (2013.01); *H04L 63/0861* (2013.01); *H04L 63/168* (2013.01); *H04L 63/20* (2013.01); *H04L 63/18* (2013.01)

(58) Field of Classification Search
CPC . H04L 67/38; H04L 63/0861; H04L 63/0272; H04L 63/168; H04L 63/20; H04L 63/0236; H04L 63/18; H04L 63/0428; H04L 63/06
See application file for complete search history.

(56) References Cited

U.S. PATENT DOCUMENTS

| 10,846,108 | B1* | 11/2020 | Chung | G06F 21/44 |
| 2015/0156214 | A1* | 6/2015 | Kaminsky | G06Q 30/0248 726/22 |
| 2016/0253772 | A1* | 9/2016 | Kofod | G06T 1/0021 382/100 |
| 2018/0373980 | A1* | 12/2018 | Huval | G06N 3/08 |
| 2020/0151617 | A1* | 5/2020 | Chauhan | H04L 67/22 |

OTHER PUBLICATIONS

Amazon, What is Amazon AppStream 2.0? downloaded Apr. 10, 2020, pp. 1-4.
Citrix, Secure Remote Desktop and App Access—Citrix, Deliver Secure and Remote Access to Multi-VDI Environments, downloaded Apr. 10, 2020, pp. 1-6.

* cited by examiner

*Primary Examiner* — Brandon Hoffman
*Assistant Examiner* — Helai Salehi
(74) *Attorney, Agent, or Firm* — Van Pelt, Yi & James LLP

(57) ABSTRACT

In an embodiment, process for providing a secure remote workspace includes accessing, via a first client application, a remote desktop application. The process includes activating, within the remote desktop, a second client application to provide access to a task. The process includes obtaining user input in connection with executing the task, and transmitting user input information associated with the execution of the task to a server.

18 Claims, 9 Drawing Sheets

Welcome https://www.example.com/firstclientapplication/signature

| Academic | Social | All Projects | My Invoices | Privacy | Referrals | Profile |

Instructions for annotators:
1. Please download an Appen Secure Browser, and use the secure browser on their local computers instead of their own browsers.
2. Please provide identifying information such as facial information.
3. Operations performed while using the annotation tools will be recorded.

| Electronic Signature | Download Secure Browser | Facial Identifier |

Please verify the account information you provided when you signed up, and electrically sign to indicate that you agree with the instructions above.

Email
Email address    testswh@example.com
                 test
                 To electronically sign, please enter your email address Password         
                 Please verify your password Your IP address  123.45.67.890
                 Your IP address will be recorded when you click "I Agree"

[ I Agree ]   [ I Do Not Agree ]

FIG. 6A

SECURE REMOTE WORKSPACE

CROSS REFERENCE TO OTHER APPLICATIONS

This application claims priority to U.S. Provisional Patent Application No. 62/946,083 entitled SECURE REMOTE WORKSPACE filed Dec. 10, 2019, which is incorporated herein by reference for all purposes.

BACKGROUND OF THE INVENTION

A machine learning model is trained to recognize and distinguish particular objects by ingesting training data. The training data includes annotated data. For example, a machine learning model is trained to accurately recognize that an object within an image is a car or a person by providing the model with many examples depicting a car or a person. The examples are annotated to indicate that there is a car or a person inside the image. Human operators manually annotate objects in datasets to build the training data. The human operators may annotate the dataset in a variety of ways such by using enterprise-controlled devices or using a Web-based annotation tool on their personal devices. However, there are many challenges attendant to such annotation tools such as security concerns because human operators may inadvertently or maliciously copy or transmit the data that they are processing.

BRIEF DESCRIPTION OF THE DRAWINGS

Various embodiments of the invention are disclosed in the following detailed description and the accompanying drawings.

FIG. 6A shows a first example graphical user interface displayed inside a first client application.

DETAILED DESCRIPTION

Figure 1:
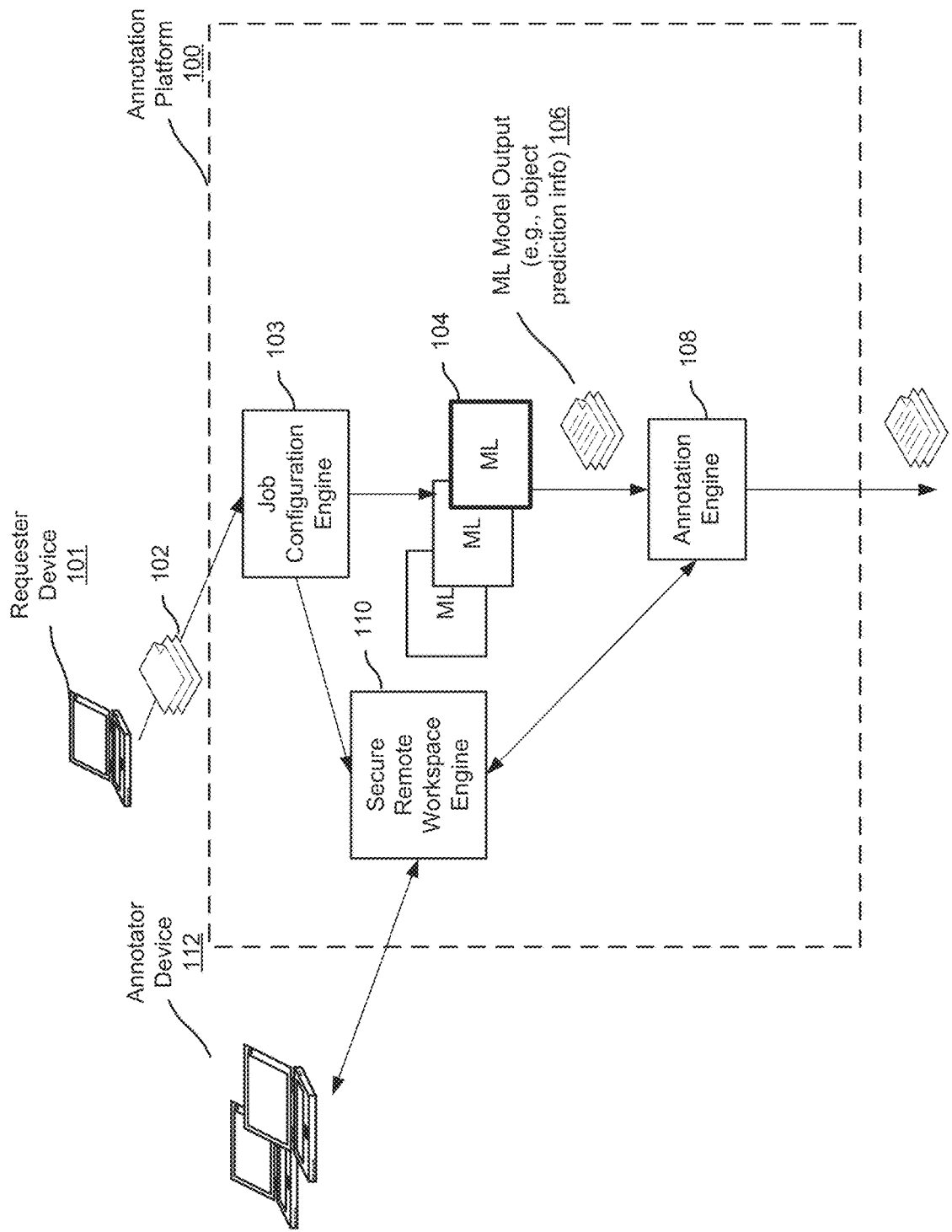
FIG. 1 is a block diagram illustrating an embodiment of an annotation platform.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Open-crowd workers are contributing increasingly to data annotations for training machine learning models. In some conventional systems, workers are using their own devices to make annotations. In other conventional systems, workers use Web-based annotation tools that can be opened using a browser's developer tool. While these conventional systems give workers a great deal of flexibility in where and when they work, there are also new security challenges because workers (or other third parties) can use their own devices and browsers to download or transmit the data without permission. For example, workers can take screenshots and download or transmit the data to unauthorized third parties. Conventional remote desktop applications mimic a local desktop and therefore provide the worker with many tools such a browser with an enabled developer mode. Running a browser in developer mode enables the user to misappropriate data.

A secure remote workspace is disclosed. The secure remote workspace provides a worker with tools to annotate data and perform other related tasks while preventing or discouraging the worker from downloading or transmitting data. In one aspect, the secure remote workspace includes features to identify a source of downloaded or transmitted data. For example, a watermark or audiomark is applied to data presented to a worker so that if the worker takes a screenshot or otherwise downloads the data, the worker who did this can be identified. In another aspect, the secure remote workspace includes features to log and audit worker sessions to prevent unauthorized actions as further described below. The secure remote workspace improves the security of Web-based annotation and prevents security breaches while being scalable and cost-effective. The secure remote workspace finds application in a variety of settings including annotating large volumes of images to generate large amounts of data for training machine learning models for various applications.

Figure 2:
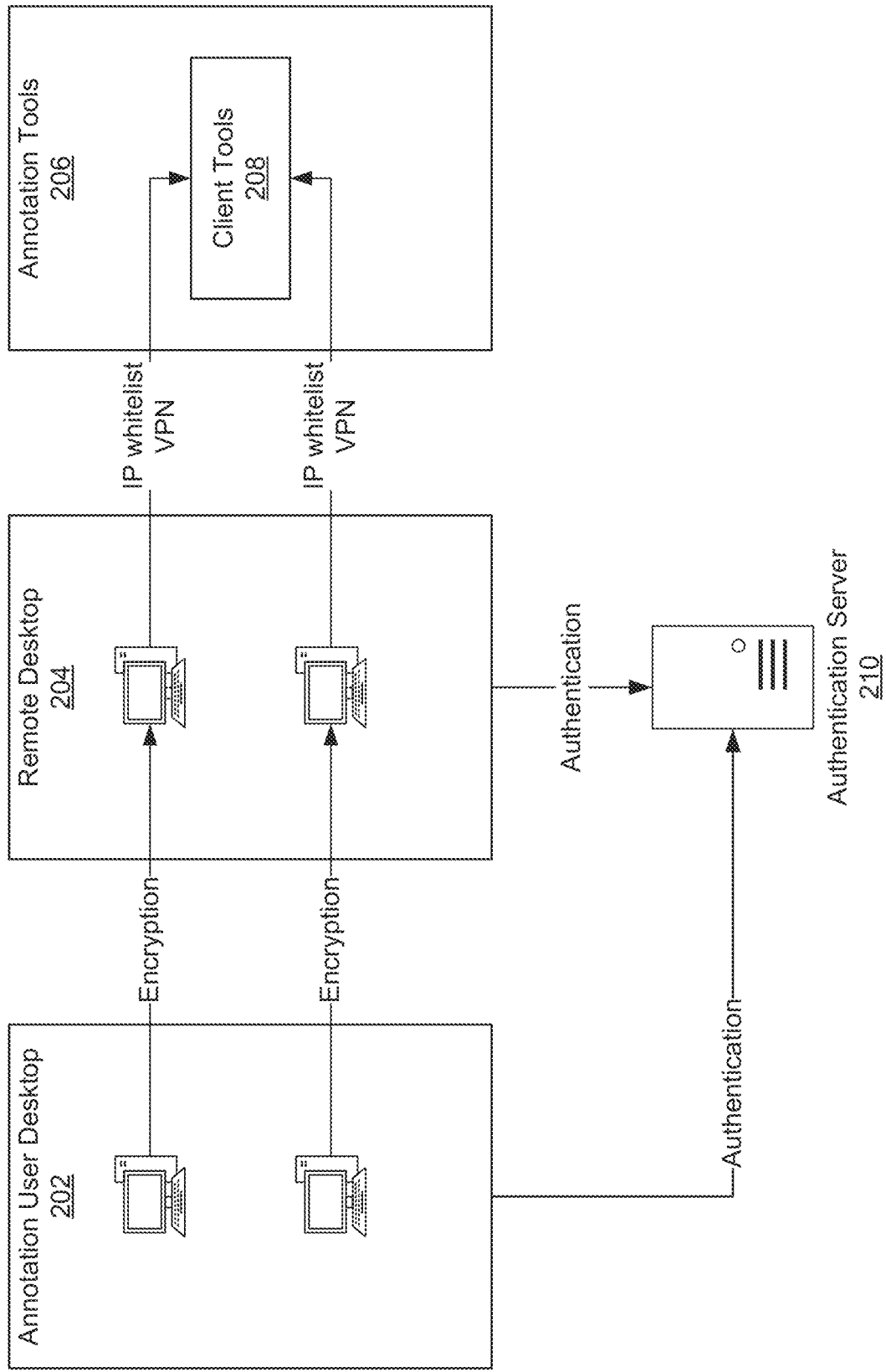
FIG. 2 is a block diagram illustrating an embodiment of a system for providing a secure remote workspace.
Figure 3:
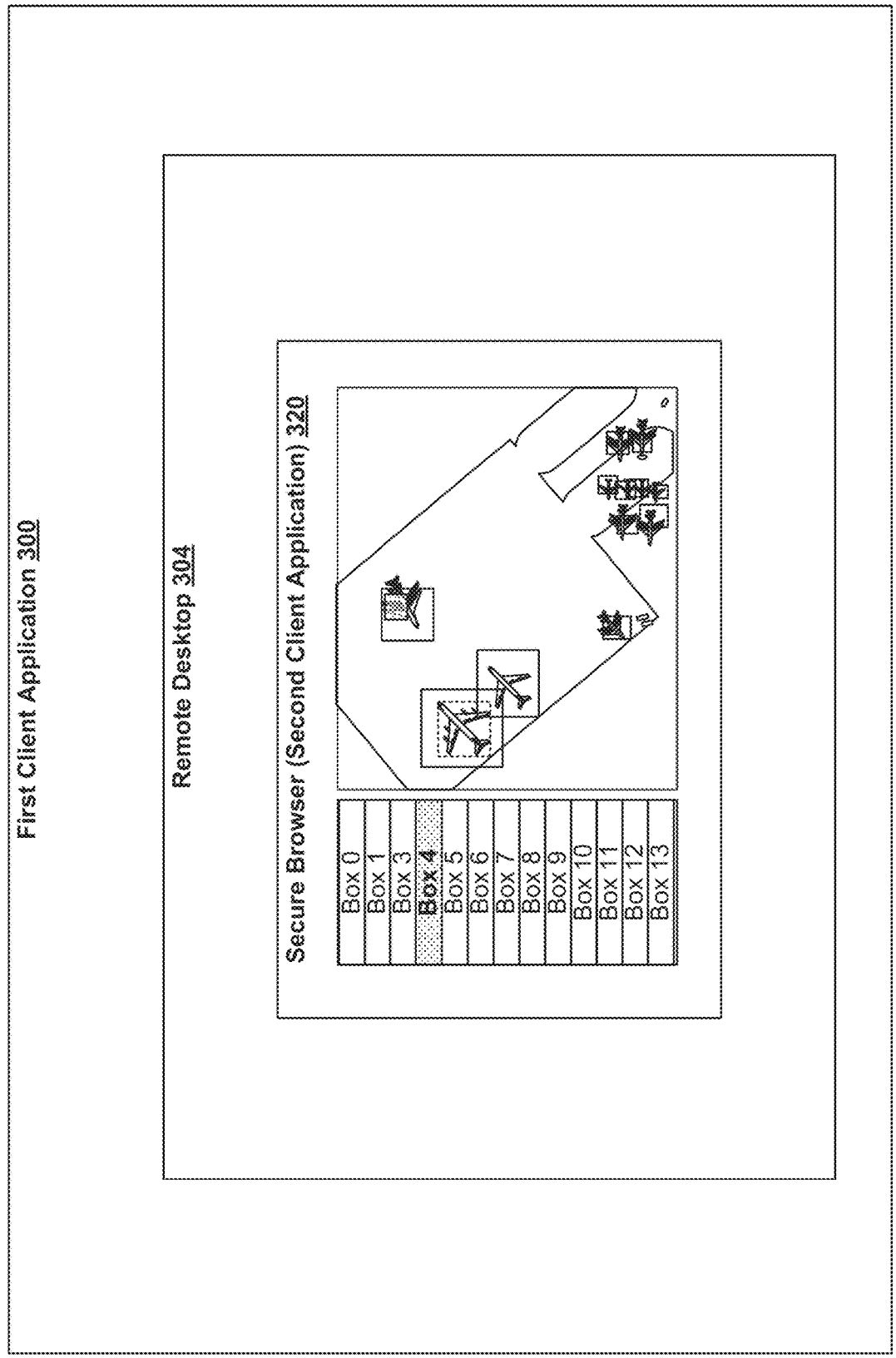
FIG. 3 shows an example of a secure browser displayed within a secure remote workspace within a first client application.
Figure 4:
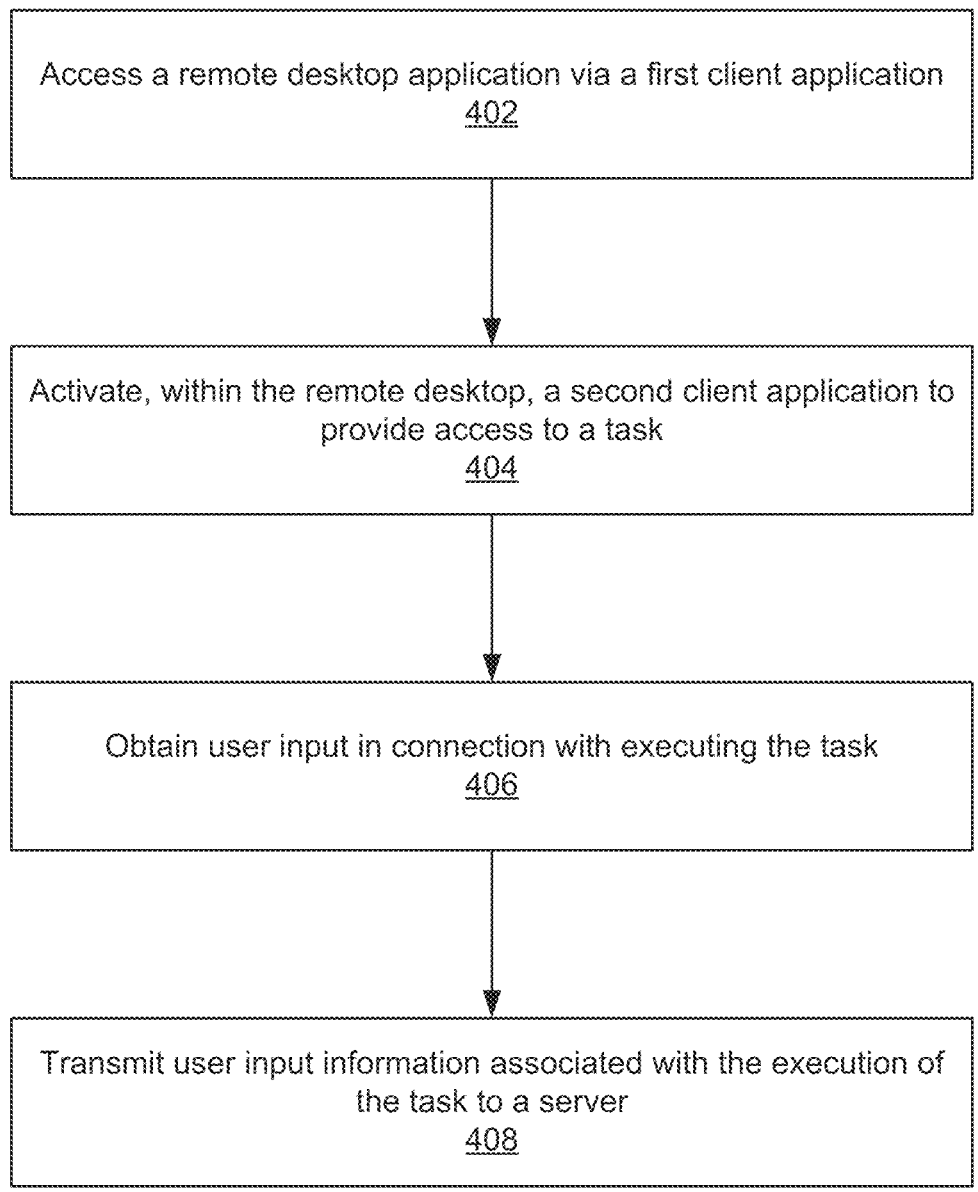
FIG. 4 is a flow chart illustrating an embodiment of a process for providing a secure remote workspace.
Figure 5:
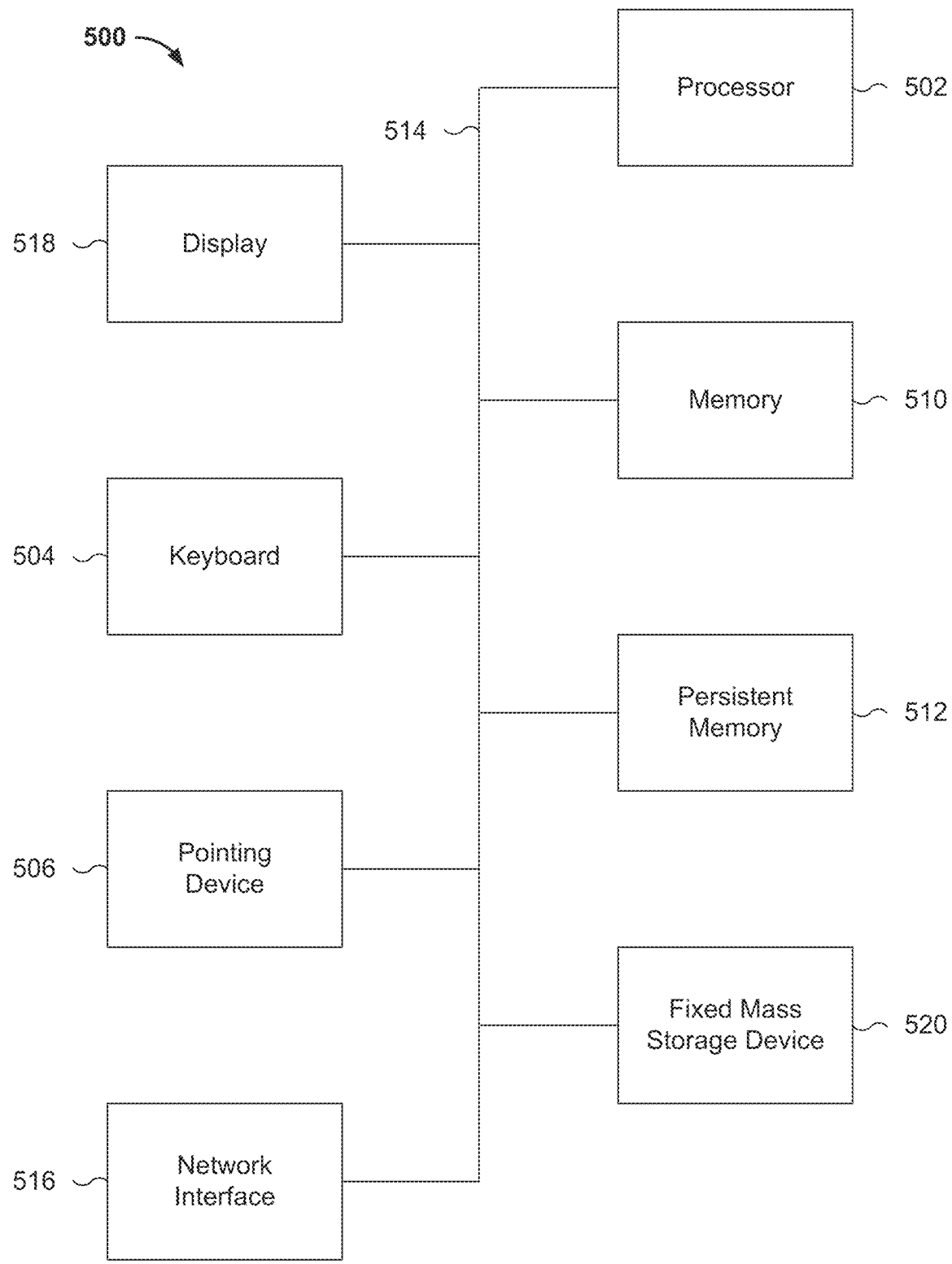
FIG. 5 is a functional diagram illustrating a programmed computer system for providing a secure remote workspace in accordance with some embodiments.

First, an annotation platform will be described (FIG. 1). Next, a system and process for providing a secure remote workspace will be described (FIGS. 2-4). Next, a device that can be used for providing a secure remote workspace will be described (FIG. 5). Finally, some example graphical user interfaces are shown (FIGS. 6A-7C).

FIG. 1 is a block diagram illustrating an embodiment of an annotation platform. In this example, annotation platform 100 can be a Figure Eight® annotation platform and can be implemented by or on one or more devices such as 500, on a cloud-based platform, or the like. The annotation platform provides user interface (UI) components for requesters to request jobs and for annotator users to complete jobs, as well as machine learning models to preprocess data such as images.

As shown, a requester (e.g., a customer of the platform) uses device 101 to access annotation platform 100 and provides a set of data 102 to the annotation platform for annotation. The example below refers to the set of data as images but this is merely exemplary and not intended to be limiting. The techniques disclosed herein can be applied to other types of data such as a block of text or audio samples. The requester can interact with annotation platform 100 using a browser-based application, a standalone client application, or the like. Sometimes the requester provide sensitive of proprietary data, which can be protected by preventing an annotator users from downloading or otherwise transmitting the data without permission using the techniques disclosed herein.

A job configuration engine 103 provides user interfaces and logic for the requester to specify the requirements for an annotation job, such as the specific types of objects to be annotated, the definitions for these types of objects, whether to annotate half an object, whether to annotate objects in the background, etc. The requester interacts with job configuration engine 103 on the platform to configure the job, providing requirements and payment information. In this example, annotators on the platform are human users that access the annotation platform using client devices 112 via browser-based applications, standalone applications, or the like. In some embodiments, the requester notifies annotators on the platform that the job is available, and the annotators select the job to participate in an annotation task. In some embodiments, the requester selects the annotators.

The annotator interacts with an annotation engine 108 via a first client application on client device 112. In this example, the first client application and annotation engine 108 cooperate to provide a user interface that displays the image and optionally at least a portion of an initial object prediction information (further described below with respect to machine learning model output 106) to the human annotator. As further described below, the first client application includes a secure remote workspace in which a second client application is displayed. The annotator can use the second client application to perform annotations. The second client application provides a user interface configured to display the image and associated object prediction information to the annotator user. Unlike conventional systems, the techniques disclosed herein provide increased security features that prevent an annotator user from downloading or transmitting data without permission. In other words, the secure remote workspace disclosed herein enhances security when an annotator user is performing a job because it prevents the annotator user from inadvertently or maliciously downloading or transmitting the data.

A secure remote workspace engine 110 is communicatively coupled to job configuration engine 103, annotation engine 108, and annotator device 112. The secure remote workspace engine 110 is configured to generate a secure remote workspace using the techniques described below so that the annotator can more securely and efficiently complete annotation tasks. In various embodiments, the secure remote workspace engine distributes tasks from job configuration 103 to annotator device 112, and collects the annotations completed by the annotator on their device to forward to annotation engine 108.

In various embodiments, the user interface is further configured to interact with the image and the prediction information, and assist the user in making annotation adjustments. The user interface assists the annotator user to select which objects/bounding boxes to view and/or edit, adjust the size and location of the bounding boxes, change the classification of an object, save the updated information, or otherwise make changes to the initial object prediction information provided by the machine learning model.

The set of images 102 can be optionally pre-processed to generate initial object prediction information prior to annotation by annotator users as follows. In various embodiments, the platform provides multiple machine learning models 104 that can be used to preprocess the images 102. Job configuration engine 103 provides an interface for the requester to select a machine learning model among the available models to preprocess the images and make an initial set of annotations before annotator users perform annotations. Any appropriate machine learning model capable of annotating (e.g., locating and classifying) objects in an image can be used, such as convolutional neural networks (CNNs), FasterRCNN, YOLO, single shot detector (SSD), Hand Craft features based classifiers like Random Forest, support vector machines, etc. Job configuration engine 103 provides the requester with performance information for each machine learning model on common object datasets such as COCO and Pascal VOC.

The selected machine learning model has been trained on similar types of images, and is able to analyze each image (e.g., identify features in the image by using convolutional filters or other standard techniques), annotate the image by determining bounding boxes around features that are identified as objects in the image (e.g., determine coordinates of the corners of a rectangular bounding box), and classify each object (e.g., label an object as a car, another object as a person, etc.). These operations performed by the machine learning model are collectively referred to as object prediction. A confidence level is associated with the bounding box and classification of an object, indicating how confident the model is in making a particular prediction. In some embodiments, the confidence level is generated by the machine learning model using standard, probability-based formulas. The machine learning model outputs object prediction information 106 associated with each annotated image, including the coordinate information of the bounding boxes surrounding the annotated objects, the classifications for the objects, and the respective confidence levels. In some embodiments, the requester specifies a confidence level threshold. In the machine learning model output 106, prediction information associated with objects that meets the confidence level threshold is kept and the rest is discarded.

It is assumed that the machine learning models are trained on relatively small sample sets and are less accurate than human annotators. Therefore, the initial object predictions generated by the machine learning models are verified and/or adjusted by the human annotators to achieve greater accuracy. Compared with not having any initial predictions, having the initial machine learning model-generated object predictions as a starting point allows the annotators to go through images at a much faster rate.

The next figure shows an example of a system for providing a secure remote workspace on client device 112 that an annotator user can use to make annotations.

FIG. 2 is a block diagram illustrating an embodiment of a system for providing a secure remote workspace. The system includes annotation user desktop 202, remote desktop 204, annotation tools 206, and authentication server 210. The number of worker desktops and remote desktops are merely exemplary and not intended to be limiting. For example, each annotation user may use one or more personal devices to perform annotation tasks by accessing a remote desktop using their personal device as follows.

With the annotation user desktop (e.g., a native operating system of the device), the user launches a first client application. The first client application then permits the user to access a remote desktop 204. The remote desktop permits the user to launch a second client application within which the user can access annotation tools 206. In various embodiments, the second client application is automatically launched by an operating system startup script and only the second client application (no other applications) is allowed to be launched within the remote desktop. A user may be asked at various checkpoints (e.g., when trying to access a remote desktop, when launching the second client application, and/or when accessing annotation tools) to authenticate the user's identity such as by providing credentials as further described below. Examples of a first client application, a remote desktop, and a second client application are shown in FIG. 3.

Returning to FIG. 2, a client application, which is a secure browser configured to communicate using a secure protocol, is streamed onto a user's terminal. There may be multiple layers of security. In this example, the annotation user desktop accesses the remote desktop via encryption. The annotation user desktop and remote desktop may be separately authenticated to an authentication server 210 by having the user provide credentials such as a username and password. In various embodiments, the annotation user desktop 202 is authenticated to the authentication server 210 via two-factor authentication (biometric authentication as a second factor).

The annotation user desktop 202 may be configured to perform one or more of the following:
- Record video or audio (in the annotator user's desktop environment)
- Whitelist/blacklist URLs
- Disable download or copy
- Apply an explicit or implicit watermark or audiomark
- Record sessions The authentication server 210 may be configured to perform one or more of the following:
- Biometrics authentication, e.g., facial recognition, fingerprint recognition including periodic or continuous validation of an annotation user
- Two factor authentication The remote desktop 204 may be configured to perform one or more of the following:
- Authorize annotation users if two factor authentication is successful
- Display only enterprise-managed applications, sites, or tools such as displaying only a secure client application and no other applications
- Disable admin abilities
- Disable disk access
- Disable download, copy, or transmit (e.g., email)
- Whitelist/blacklist IP/port The remote desktop can access certain client tools 208 for performing annotation tasks based on the tasks or projects that an annotator user is performing. For example, when an annotator user elects to begin a specific job, their remote desktop's IP address may be added to a whitelist so that they are able to access certain tools.

FIG. 3 shows an example of a secure browser displayed within a secure remote workspace within a first client application. An annotation user can perform tasks within the secure browser 320. The secure browser is an example of a second client application that can be launched from a remote desktop. As further described with respect to FIG. 4, an annotation user's interactions with the secure browser is called a "session," and the session can be recorded to monitor the annotation user's actions and prevent actions that may cause security breaches.

Referring to FIG. 2, first client application 300, remote desktop 304, and secure browser 320 are related as follows. A user can access/launch first client application 300 from annotation user desktop 202. The user can then access/launch remote desktop 304 within the first client application 300. From the remote desktop 304, the user can access/launch annotation tools. Launching the secure browser from the remote desktop and providing annotation tools within the secure browser 320 has many security advantages. For example, the annotation tools are provided within a secure browser with limited capabilities (such as developer tools that enable the user to disable functions of the browser such as Javascript, inspect elements of a Web site, edit CSS, etc.) so the annotation user cannot use the secure browser to download or transmit data without permission. An example of an annotation task (which is not intended to be limiting) is shown here, and further described with respect to FIG. 7C. As further described herein, security can be additionally enhanced by authenticating the user at one or more checkpoints such as when the user launches the first client application, launches the remote desktop, launches the secure browser, and/or launches the annotation tools.

In various embodiments, a watermark is applied to a user's session or when a user takes a screenshot of items displayed in the secure browser. The watermark can be applied in a variety of ways for example by adding a unique identifier of the annotation user to the HTML or changing a pixel in the image where the changed pixel is not necessarily visible to the typical human eye. An example of a user interface with an applied watermark is shown in FIG. 7C.

FIG. 4 is a flow chart illustrating an embodiment of a process for providing a secure remote workspace. The process can be performed by an annotation platform such as 100 of FIG. 1, client device 112 of FIG. 1, or processor 502 of FIG. 5.

The process begins by accessing via a first client application, a remote desktop application (402). For example, a process within client device 112 accesses (within its desktop) a first client application. Then, the process launches a remote desktop within the first client application. The first client application can be a standard browser for the Internet such as Chrome®, Firefox®, Internet Explorer®, or the like. In various embodiments, the first client application is customized to be secure and permit or forbid certain actions. Client applications can also be customized by providing a plug-in. For example, the first client application is configured to access only whitelisted URLs, to forbid/prevent access to/of blacklisted URLs, to disable developer tools, etc. One way to disable developer tools is to disable functions designed by the browser designer to open developer tools such as the browser menu and shortcut keys. In various embodiments, the remote desktop only accepts the connection from the customized first client application.

The process activates, within the remote desktop, a second client application to provide access to a task (404). The second client application may have the same features as the first client application unless otherwise described. In various embodiments, the second client application is modified based on a standard browser.

The process obtains user input in connection with executing the task (406). As described with respect to FIG. 1, user input includes input by annotation users performed as part of tasks to annotate data. In various embodiments, the secure remote workspace (remote desktop) is configured to record session information associated with execution of the task. Examples of session information that can be recorded include user actions within the secure remote workspace such as time spent on a particular task, a history/trail of browsing or work habits, and/or video of the user (given that the user has provided permission for recording this session information).

In various embodiments, the second client application is configured to add a watermark to data output to the user. The watermark is uniquely associated with the user such as a user ID. This means that when the user copies, downloads, or transmits the data (e.g., takes a screen shot), the data contains a watermark identifying the user who copied/downloaded/transmitted the data. The watermark can be of various formats such as a visible watermark added as an HTML layer, an obscured watermark added as an HTML layer, an audio watermark (such as background noise or audio in a frequency range inaudible to the typical human ear), or the like. For example, when a Webpage is loaded, a transparent HTML layer with watermarks is added on top of the other Webpage layers. In various embodiments, the watermark is automatically inserted into the HTML as Javascript by fetching the user ID and generating a watermark based on the user ID.

The process transmits user input information associated with execution of the task to a server (408). Transmitting the user input information collects annotated data, which can be used to label data as described with respect to FIG. 1, among other things.

In various embodiments, prior to or as part of activating the second client application to provide access to a task, a user is authenticated. The authentication can be based on an image of the user, comparing an image of the user with stored user image information, based on a video of the user, or detecting movement in the video of the user.

In various embodiments, a remote desktop session automatically ends after a period of inactivity. The length is user-configurable, e.g., 15 minutes.

FIG. 5 is a functional diagram illustrating a programmed computer system for providing a secure remote workspace in accordance with some embodiments. As will be apparent, other computer system architectures and configurations can be used to perform the described secure remote workspace technique. Computer system 500, which includes various subsystems as described below, includes at least one microprocessor subsystem (also referred to as a processor or a central processing unit (CPU) 502). For example, processor 502 can be implemented by a single-chip processor or by multiple processors. In some embodiments, processor 502 is a general purpose digital processor that controls the operation of the computer system 500. In some embodiments, processor 502 also includes one or more coprocessors or special purpose processors (e.g., a graphics processor, a network processor, etc.). Using instructions retrieved from memory 510, processor 502 controls the reception and manipulation of input data received on an input device (e.g., image processing device 506, I/O device interface 504), and the output and display of data on output devices (e.g., display 518).

Processor 502 is coupled bi-directionally with memory 510, which can include, for example, one or more random access memories (RAM) and/or one or more read-only memories (ROM). As is well known in the art, memory 510 can be used as a general storage area, a temporary (e.g., scratch pad) memory, and/or a cache memory. Memory 510 can also be used to store input data and processed data, as well as to store programming instructions and data, in the form of data objects and text objects, in addition to other data and instructions for processes operating on processor 502. Also as is well known in the art, memory 510 typically includes basic operating instructions, program code, data, and objects used by the processor 502 to perform its functions (e.g., programmed instructions). For example, memory 510 can include any suitable computer readable storage media described below, depending on whether, for example, data access needs to be bi-directional or uni-directional. For example, processor 502 can also directly and very rapidly retrieve and store frequently needed data in a cache memory included in memory 510.

A removable mass storage device 512 provides additional data storage capacity for the computer system 500, and is optionally coupled either bi-directionally (read/write) or uni-directionally (read only) to processor 502. A fixed mass storage 520 can also, for example, provide additional data storage capacity. For example, storage devices 512 and/or 520 can include computer readable media such as magnetic tape, flash memory, PC-CARDS, portable mass storage devices such as hard drives (e.g., magnetic, optical, or solid state drives), holographic storage devices, and other storage devices. Mass storages 512 and/or 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can be used to provide access to other subsystems and devices as well. As shown, these can include a display 518, a network interface 516, an input/output (I/O) device interface 504, an image processing device 506, as well as other subsystems and devices. For example, image processing device 506 can include a camera, a scanner, etc.; I/O device interface 504 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 500. Multiple I/O device interfaces can be used in conjunction with computer system 500. The I/O device interface can include general and customized interfaces that allow the processor 502 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 516 allows processor 502 to be coupled to another computer, computer network, or telecommunications network using a network connection as shown. For example, through the network interface 516, the processor 502 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 5 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 504 and display 518 share the touch sensitive screen component, which both detects user inputs and displays outputs to the user). In addition, bus 514 is illustrative of any interconnection scheme serving to link the subsystems. Other computer architectures having different configurations of subsystems can also be utilized.

FIG. 6A shows a first example graphical user interface displayed inside a first client application. This is an example of content displayed to an annotator user after the annotator user launches a first client application within the annotation user's desktop. For example, a user launches a standard Web browser to login to the user's account. Various examples such as toolbar 602, text 604, and tabs 608 are shown but these elements are merely exemplary and not intended to be limiting. The toolbar 602 shows that this Webpage can be part of a larger Website hierarchy providing content to an annotator user.

Here, the example user workflow includes acknowledging, verifying, or authenticating an identity by providing an electronic signature. The electronic signature is also the user's assent to the project parameters, which is using a secure browser and having user actions within a session be recorded. The session information can be recorded using capabilities of the user's device such as the camera to verify the identity of the user and that the same user completes the annotation task, recording a user's actions within the secure browser by periodically taking a screenshot of the user's desktop, or extracting information about the actions performed during the session and logging the information. The user then downloads the secure browser, provides biometric/facial data, and can then perform annotation tasks.

Figure 6B:
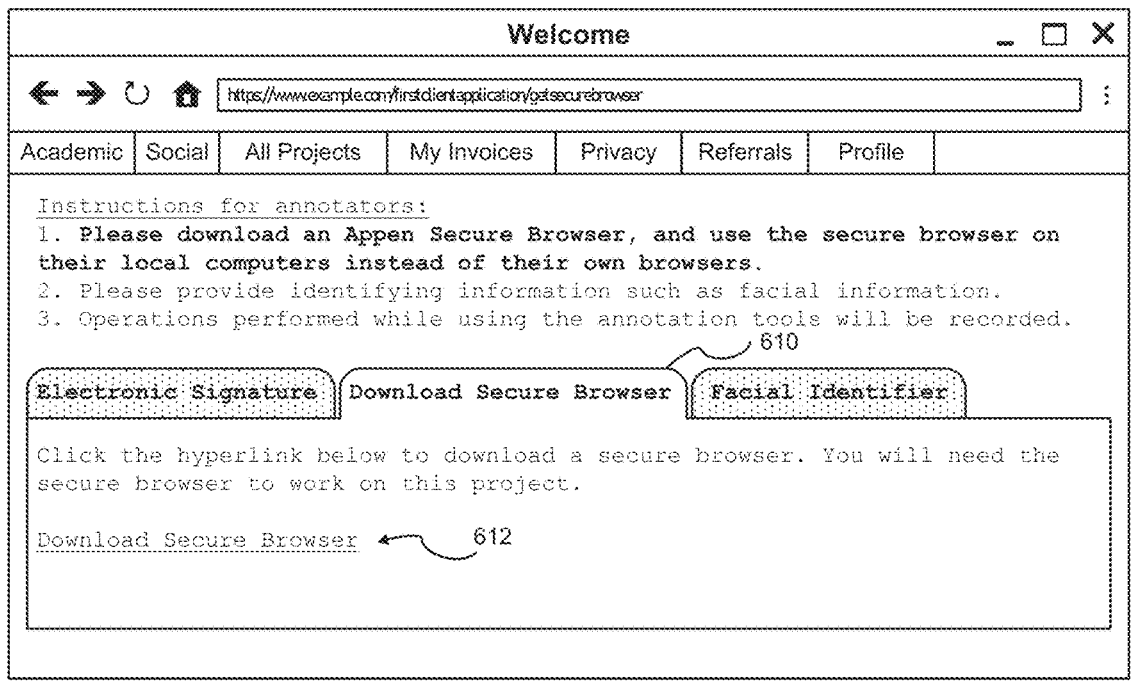
FIG. 6B shows a second example graphical user interface displayed inside a first client application.
Figure 6C:
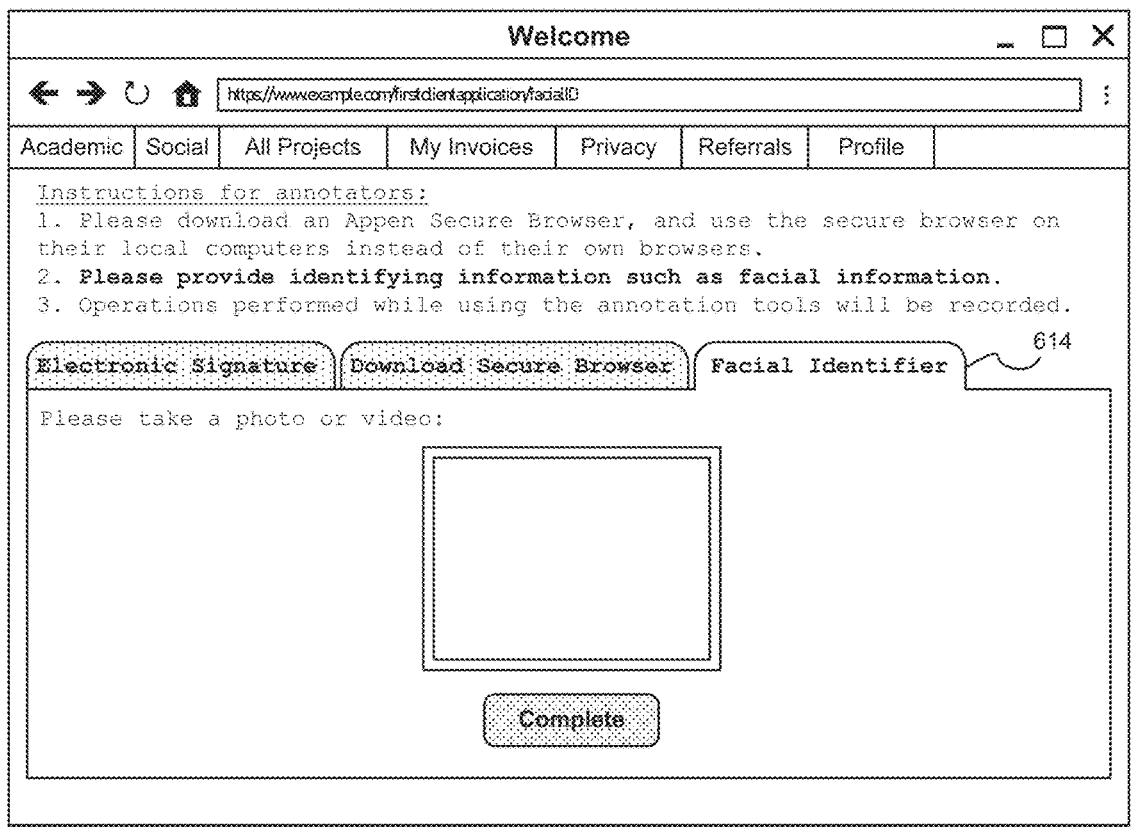
FIG. 6C shows a third example graphical user interface displayed inside a first client application.

FIG. 6B shows a second example graphical user interface displayed inside a first client application. A user may use the first client application to download a remote desktop application (secure browser) as shown in FIG. 6B. The annotation user can select the link 612 to download a secure browser FIG. 6C shows a third example graphical user interface displayed inside a first client application. User identification information is collected at FIG. 6B. FIG. 6C shows an example of collecting a face image or video of a user at the time of registration. Some of the information may be used later on for authentication purposes (such as biometric or two factor authentication). This information may be used later to verify the identity of the annotator user such as ensuring that the user is present for a task and the user is who they say they are. The user provides a facial identifier user interface 614 in the form of a photo/video by using a camera coupled to the device in which the user is accessing the first client application. For example, a user can use a smartphone camera to take a selfie photo or video to complete the request for biometric information.

In various embodiments, a user does not need to download a secure browser every time. For example, after an annotator user registers with the Website by providing facial identification and downloading the remote desktop, then the user can subsequently access the login to the secure workspace (FIG. 7A) directly without needing to go through the screens shown in FIGS. 6A-6C.

After the user downloads the secure browser (remote desktop application), the user can access a second client application within the secure browser. The following figures show some examples of the second client application.

Figure 7A:
FIG. 7A shows a first example graphical user interface displayed inside a second client application.

FIG. 7A shows a first example graphical user interface displayed inside a second client application. An annotator user can login to perform annotation tasks using the interface shown in FIG. 7A. Here, the annotator signs in by providing a username. In other embodiments, other types of login information can be provided such as a username and password pair, a face image or video, or the like.

Figure 7B:
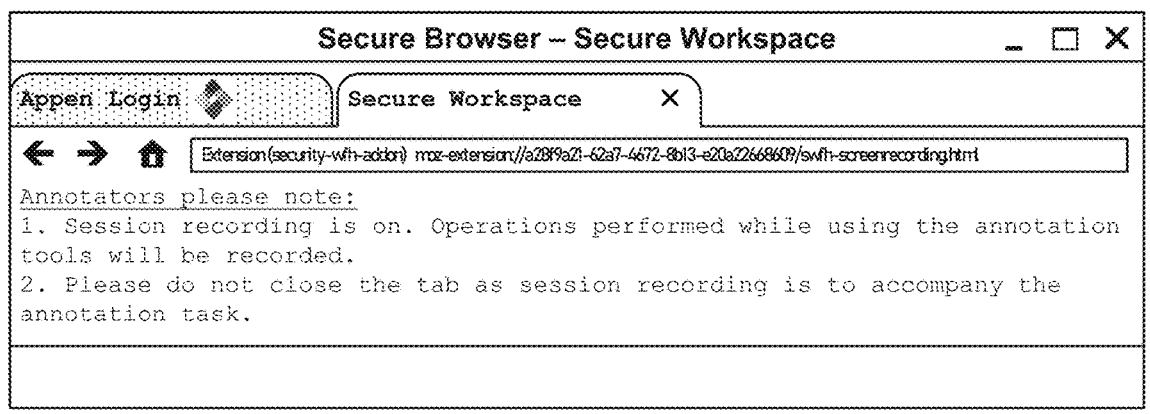
FIG. 7B shows a second example graphical user interface displayed inside a second client application.
Figure 7C:
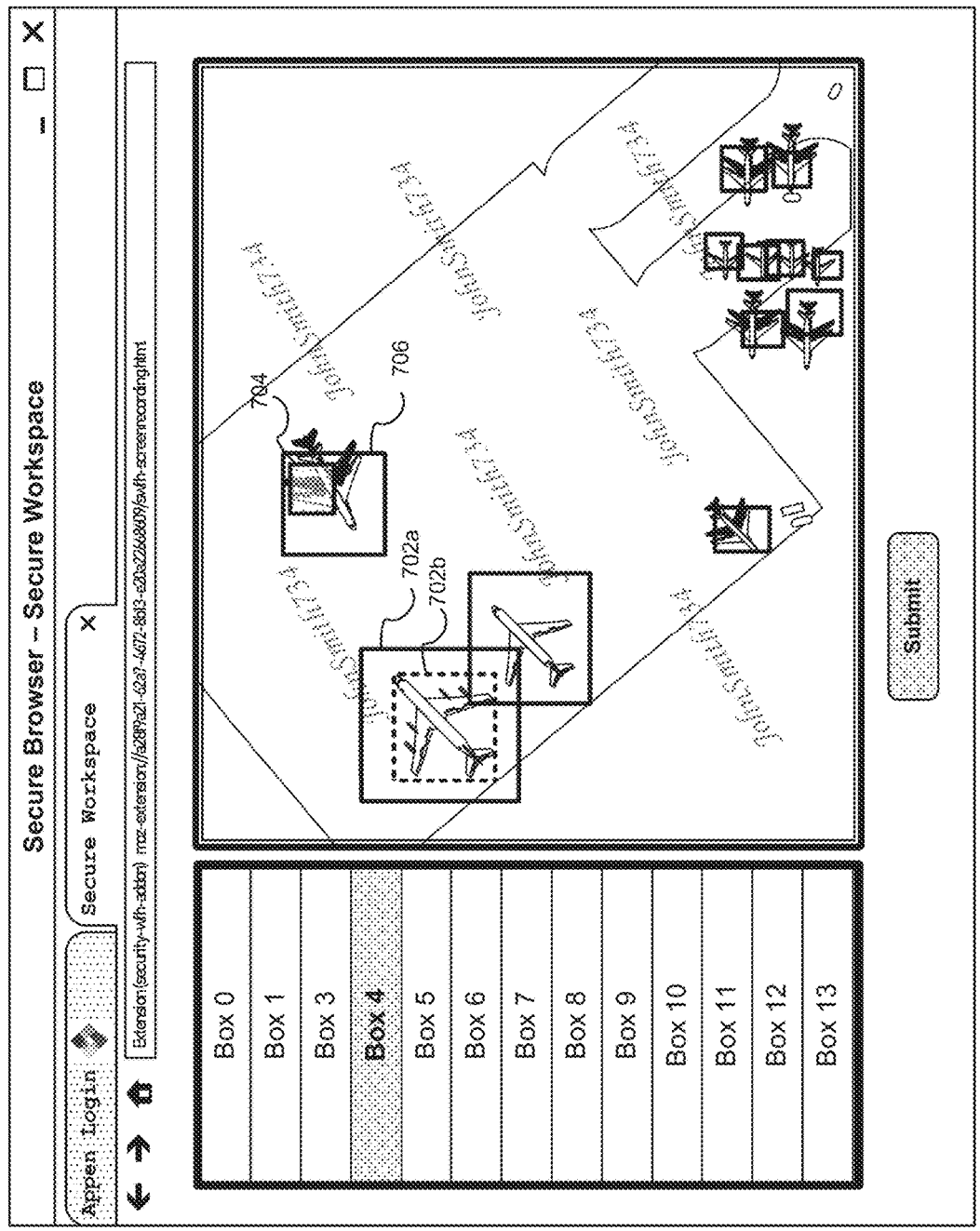
FIG. 7C shows a third example graphical user interface displayed inside a second client application.

FIG. 7B shows a second example graphical user interface displayed inside a second client application. When the second client application is launched as shown in FIG. 7B capabilities of conventional browser/applications are not present. In other words, the second client application is a customized browser. In this example, only a single client application (here, a browser) is displayed and the browser does not have any developer tools. By contrast, the standard Web browser shown in the previous figures is different from the customized browser. For example, in the standard Web browser the user can access developer tools 680, which enables the user to perform actions such as disabling Javascript, downloading site content, transmitting site content that may cause misappropriation of site data.

FIG. 7C shows a third example graphical user interface displayed inside a second client application. Here a watermark applied to data output to the user. Here, the watermark is a visual watermark bearing the user ID of the user ("JohnSmith734"). If a screenshot is taken, the content of the screenshot will also have the watermark, which identifies who took the screenshot.

The annotation task here is to identify different types of aircraft. The initial predictions are shown in the boxes with solid lines. A UI tool allows the user to activate a bounding box (e.g., making the box editable) by using a cursor. In this case, when the user moves the mouse such that the cursor is over the object or the bounding box (e.g., when the cursor hovers over the object or the bounding box), the bounding box is activated and ready to be edited. An adjusted result is shown in the dashed box 702b, where the user has adjusted the bounding box sizes for the airplane inside box 702a.

In this state, the annotator user is about to make an adjustment to box 704 which is highlighted in the left-hand menu as well as in the photo/video of airplanes on the right-hand side. A user could delete box 704, which was erroneously identified by a pre-processor as a separate airplane from 706 (perhaps due to a shadow cast by airplane 706). Once the user has completed the annotation, he can submit the result by clicking on a submit button.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
accessing, via a first client application executing at an annotator device, a remote desktop application;
activating, within the remote desktop application, a second client application to provide access to a task;
displaying, within the remote desktop application, the task including an object to be annotated and at least a portion of an initial object prediction information to a user;
obtaining input from the user in connection with executing the task and based at least in part on the initial object prediction information; and
transmitting user input information associated with the execution of the task to a server, wherein:
the first client application is configured to disable downloading or copying of data including by recording session information associated with the execution of the task; and
the second client application is configured to add a watermark output to the user, the watermark including an obscured watermark added as an HTML layer including by inserting the watermark as Javascript based at least on a user ID.

2. The method of claim 1, wherein the first client application is a secure browser configured to communicate using a secure protocol and the remote desktop application is streamed onto a user terminal.

3. The method of claim 1, wherein the first client application includes a secure browser configured to access only whitelisted URLs.

4. The method of claim 1, wherein the first client application includes a secure browser configured to prevent access of blacklisted URLs.

5. The method of claim 1, wherein the first client application is configured to disable developer tools.

6. The method of claim 1, wherein the second client application is modified based on a standard browser.

7. The method of claim 1, wherein the watermark includes a visible watermark added as an HTML layer.

8. The method of claim 1, wherein the watermark includes an audio watermark.

9. The method of claim 1, wherein the watermark includes an audio watermark in a frequency range beyond typical human hearing.

10. The method of claim 1, further comprising recording session information associated with execution of the task.

11. The method of claim 1, further comprising performing an authentication of a user.

12. The method of claim 1, wherein the task is an annotation task.

13. The method of claim 11, wherein the authentication is based on an image of the user.

14. The method of claim 11, wherein the authentication is based on a video of the user.

15. The method of claim 13, wherein the authentication includes comparing an image of the user with stored user image information.

16. The method of claim 14, wherein the authentication includes detecting movement in the video of the user.

17. A system comprising:
a processor configured to:
access via a first client application executing at an annotator device, a remote desktop application;
activate, within the remote desktop application, a second client application to provide access to a task;
display, within the remote desktop application, the task including an object to be annotated and at least a portion of an initial object prediction information to a user;
obtain input from the user in connection with executing the task and based at least in part on the initial object prediction information; and
transmit user input information associated with the execution of the task to a server, wherein:
the first client application is configured to disable downloading or copying of data including by recording session information associated with the execution of the task; and
the second client application is configured to add a watermark output to the user, the watermark including an obscured watermark added as an HTML layer including by inserting the watermark as Javascript based at least on a user ID; and
a memory coupled to the processor and configured to provide the processor with instructions.

18. A computer program product embodied in a non-transitory computer readable storage medium and comprising computer instructions for:
accessing, via a first client application executing at an annotator device, a remote desktop application;
activating, within the remote desktop application, a second client application to provide access to a task;
displaying, within the remote desktop application, the task including an object to be annotated and at least a portion of an initial object prediction information to a user;
obtaining input from the user in connection with executing the task and based at least in part on the initial object prediction information; and
transmitting user input information associated with the execution of the task to a server, wherein:
the first client application is configured to disable downloading or copying of data including by recording session information associated with the execution of the task; and
the second client application is configured to add a watermark output to the user, the watermark including an obscured watermark added as an HTML layer including by inserting the watermark as Javascript based at least on a user ID.

\* \* \* \* \*